United States Patent
Beskrovny et al.

(10) Patent No.: US 9,459,993 B2
(45) Date of Patent: Oct. 4, 2016

(54) PERFORMANCE TESTING OF WEB COMPONENTS USING IDENTITY INFORMATION

(71) Applicant: International Business Machines Corporation, Armonk, NY (US)

(72) Inventors: Evgeny Beskrovny, Ramat Gan (IL); Bertrand Cormier, Tournefeuille (FR); Jerome Gout, Toulouse (FR); Omer Tripp, Har-Adar (IL); Emmanuel Wurth, Toulouse (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 480 days.

(21) Appl. No.: 13/869,424

(22) Filed: Apr. 24, 2013

(65) Prior Publication Data

US 2013/0311829 A1 Nov. 21, 2013

(30) Foreign Application Priority Data

May 16, 2012 (GB) .................................. 1208598.1

(51) Int. Cl.
- G06F 9/44 (2006.01)
- G06F 11/36 (2006.01)
- G06F 11/34 (2006.01)
- G06F 11/00 (2006.01)

(52) U.S. Cl.
CPC ......... *G06F 11/3668* (2013.01); *G06F 11/006* (2013.01); *G06F 11/3447* (2013.01); *G06F 11/3409* (2013.01); *G06F 11/3466* (2013.01); *G06F 2201/865* (2013.01); *G06F 2201/875* (2013.01)

(58) Field of Classification Search
CPC ....................................................... G06F 11/36
See application file for complete search history.

(56) References Cited

U.S. PATENT DOCUMENTS

| | | | |
|---|---|---|---|
| 7,310,777 B2 * | 12/2007 | Cirne | 715/763 |
| 7,490,023 B2 | 2/2009 | Aniszozyk et al. | |
| 7,668,112 B2 | 2/2010 | Helfman et al. | |
| 2003/0093717 A1 * | 5/2003 | Mason | 714/38 |
| 2009/0089759 A1 | 4/2009 | Rajan et al. | |
| 2009/0125976 A1 | 5/2009 | Wassermann et al. | |
| 2009/0193391 A1 * | 7/2009 | Miller et al. | 717/105 |

OTHER PUBLICATIONS

UK Appln. No. GB1208598.1 filed May 16, 2012, Search Report, Aug. 22, 2012, 4 pgs.

* cited by examiner

*Primary Examiner* — Hang Pan
(74) *Attorney, Agent, or Firm* — Cuenot, Forsythe & Kim, LLC

(57) ABSTRACT

Performance testing of web components using identity information includes providing a web component for testing having business logic code and an associated authorization layer code, locating, using a processor, branches in the authorization layer code and the business logic code which are dependent on identity information, and creating, using the processor, symbolic identities with claims or attributes having values corresponding to the branch options of the located branches. The method also includes propagating the symbolic identities downstream from the branch locations through the authorization layer code and the business logic code and analyzing, using the processor, the performance of each symbolic identity.

20 Claims, 6 Drawing Sheets

PERFORMANCE TESTING OF WEB COMPONENTS USING IDENTITY INFORMATION

CROSS-REFERENCE TO RELATED APPLICATIONS

This application claims the benefit of United Kingdom Application Number 1208598.1 filed on May 16, 2012, which is fully incorporated herein by reference.

BACKGROUND

Cloud computing is gaining increasing momentum as more and more services are being migrated into the cloud. As part of the process of migrating an application or a web service into the cloud, an authorization layer is normally added to mediate access to the service.

In many cases this layer uses fine-grained identity information about the user (contrary to coarse identifiers, such as the user's role) for making authorization decisions.

The entire system, including the original business logic and the added authorization layer, may be committed to service-level agreements in terms of response time. For example, if a customer is soliciting the help of a web service residing on the cloud, then that customer would like to guarantee a response time of up to X seconds to an arbitrary request.

The challenge this scenario brings forward is that while the business logic typically undergoes extensive performance testing via unit tests, integration tests, and quality assurance teams, the entire system including both the original business logic and the new authorization layer built on top of it, is hard to test.

The reason for this is the necessity to supply the identity information. In many cases different identities lead an execution flow of the code to different branches that might:

(i) make calls to external entities for special authentication requests (in federated environments the authentication is done by the external entity which has the trust relationship with the cloud authentication service);

(ii) access back-end databases to correlate and validate user-provided information;

(iii) perform CPU-intensive processing of incoming data, such as encryption and decryption of parts of it.

The problem here is to find those identities which are going to produce meaningful results. Sometimes, a worst case scenario that can be used for evaluating service level agreements is interesting and, sometimes, it is interesting to see whether a particular property has an impact on performance and to test the service with various values for those properties.

Therefore, there is a need in the art to address the aforementioned problems.

Although this problem particularly arises with the identity management technologies required in cloud computing, it also applies to non-cloud web services and web application which use identity frameworks.

BRIEF SUMMARY

A method for performance testing of web components using identity information includes providing a web component for testing having business logic code and an associated authorization layer code, locating, using a processor, branches in the authorization layer code and the business logic code which are dependent on identity information, and creating, using the processor, symbolic identities with claims or attributes having values corresponding to the branch options of the located branches. The method further includes propagating the symbolic identities downstream from the branch locations through the authorization layer code and the business logic code and analyzing, using the processor, performance of each symbolic identity.

A system for performance testing of web components using identity information includes a processor programmed to initiate executable operations. The executable operations include providing a web component for testing having business logic code and an associated authorization layer code, locating branches in the authorization layer code and the business logic code which are dependent on identity information, and creating symbolic identities with claims or attributes having values corresponding to the branch options of the located branches. The executable operations further include propagating the symbolic identities downstream from the branch locations through the authorization layer code and the business logic code and analyzing, using the processor, performance of each symbolic identity.

A computer program product for performance testing of web components using identity information includes a computer readable storage medium having program code stored thereon. The program code is executable by a processor to perform a method. The method includes providing, using the processor, a web component for testing having business logic code and an associated authorization layer code, locating, using the processor, branches in the authorization layer code and the business logic code which are dependent on identity information, and creating, using the processor, symbolic identities with claims or attributes having values corresponding to the branch options of the located branches. The method further includes propagating, using the processor, the symbolic identities downstream from the branch locations through the authorization layer code and the business logic code and analyzing, using the processor, performance of each symbolic identity.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Figure 1:
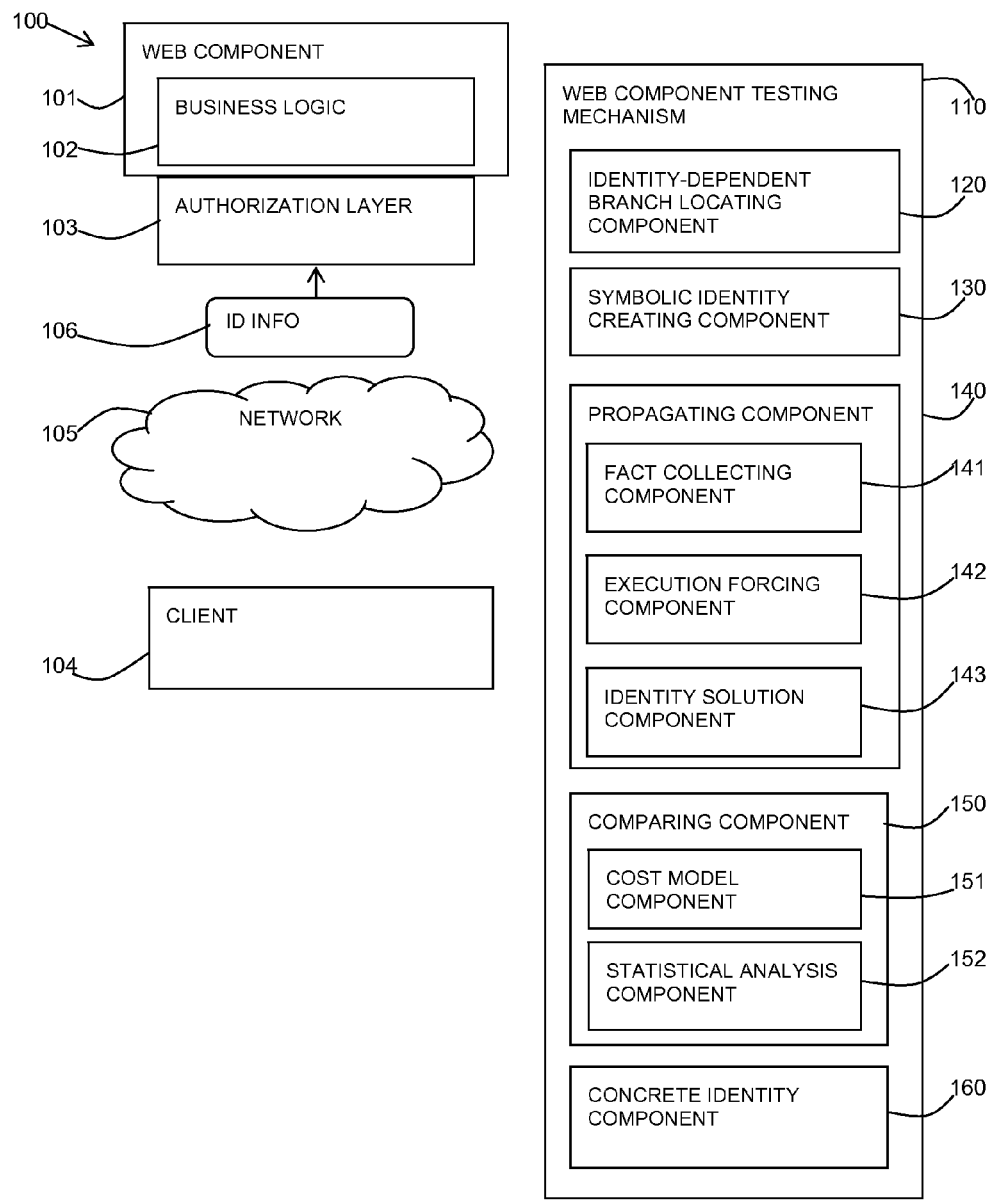
FIG. 1 is block diagram of an example embodiment of a system in accordance with the present invention.

This invention relates to the field of performance testing of web components. In particular, the invention relates to performance testing of web components in the presence of identity information.

According to a first aspect of the present invention there is provided a method for performance testing of web components using identity information, including: providing a web component for testing having business logic code and an associated authorization layer code; locating branches in the authorization layer code and the business logic code which are dependent on identity information; creating symbolic identities with claims or attributes having values corresponding to the branch options of the located branches; propagating the symbolic identities downstream from the branch locations through the authorization layer code and the business logic code; and analyzing the performance of each symbolic identity.

According to a second aspect of the present invention there is provided a system for performance testing of web components using identity information, wherein the web component for testing has business logic code and an associated authorization layer code, the system comprising: an identity-dependent branch locating component for locating branches in the authorization layer code and the business logic code which are dependent on identity information; a symbolic identity creating component for creating symbolic identities with claims or attributes having values corresponding to the branch options of the located branches; a propagating component for propagating the symbolic identities downstream from the branch locations through the authorization layer code and the business logic code; and a comparing component for analyzing the performance of each symbolic identity.

According to a third aspect of the present invention there is provided a computer program product for performance testing of web components using identity information, the computer program product comprising a computer readable storage medium having computer-readable program code embodied therewith, the computer-readable program code configured to: provide a web component for testing having business logic code and an associated authorization layer code; locate branches in the authorization layer code and the business logic code which are dependent on identity information; create symbolic identities with claims or attributes having values corresponding to the branch options of the located branches; propagate the symbolic identities downstream from the branch locations through the authorization layer code and the business logic code; and analyze the performance of each symbolic identity.

According to a fourth aspect of the present invention there is provided a method substantially as described with reference to the figures.

According to a fifth aspect of the present invention there is provided a system substantially as described with reference to the figures.

The described aspects of the invention provide the advantage of performing a static analysis of the code in order to find the identity dependent branches within the code that are likely to have an impact on the performance perspective and then during the test to use those identities. It is also possible to divide the infinite space of the possible identities into equivalence classes that differ by the performance and to perform testing for each class.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for performance testing of web components under specific identities in order to evaluate performance.

This solution applies to performance testing of web components which have or use an authorization layer with identity management. In cloud computing, an end user must login to the cloud in order to access a web component and, therefore, an authorization layer is provided. In a non-cloud web component, an authorization layer may be provided if access to the web component is restricted or the user requires validation or authentication.

The term web component is defined as including web services, web applications, both in the cloud and not in the cloud.

The described method and system perform analysis of the authorization layer as well as the business logic to find those branches in the code which are dependent on identity information. Then each branch is assessed from the performance perspective using some cost model to see which particular properties are important from the performance perspective. After that, it is possible to create synthetic identities that produce different response times and to test the performance using those identities.

The analysis of the authorization layer and the business logic layer of a web component may be carried out by static analysis performing automatic code analysis; this may also be referred to as program analysis or static program analysis.

Referring to FIG. 1, a schematic diagram shows an example embodiment of the described system 100.

A web component 101 may be provided including business logic 102. The web component 101 may be a web service or web application and may be provided in a cloud computing environment or as a non-cloud web component both accessible by a client 104 via a network 105.

An authorization layer 103 may be provided between the client 104 and the web component 101 for processing identity information 106 of a client 104 user to determine authorization of the client 104 user to access the web component 101.

In the context of cloud computing, the authorization layer 103 may use fine-grained identity information in an identity management system. A user at a client 104 must log-on to a cloud computing identity management system before accessing web components offered in the cloud.

In the context of non-cloud computing, the authorization layer 103 may be provided by an identity management system independent from the web component 101 or may be provided as part of the web component 101. Such identity management systems may be required for the web component 101 if the web component involves payments, age restrictions, or sensitive information, etc.

Identity management systems providing the authorization layer 103 both in cloud computing and non-cloud environments may take various forms. For example, they may use secure messaging mechanisms such as provided by the Web Services Security model.

In one embodiment, WS-Trust (Web Services Trust specification) may be used to define security token exchange to enable issuance and dissemination of credentials within different trust domains. WS-Trust may be used with business to business communication via web services in which back-end web services talk to each other.

In another embodiment, WS-Federation (Web Services Federation specification) may be used to define mechanisms to allow different security realms to federate by allowing and brokering trust of identities, attributes, authentication between participating web services. WS-Federation is a browser oriented standard in which the client is a browser which talks to an application.

In a further embodiment, claims-based identity may be used which provides a means for an application to acquire identity information of users. It provides a consistent approach for applications running on a local server, a web server, or in the cloud. Claims-based identify abstracts the individual elements of identity and access control into two parts: a claim, and an issuer or authority. A claim is a statement that a user makes about itself or another subject. For example, the claim may relate to a name, group, buying preference, privilege, association, capability, etc. Claims are packaged into tokens issued by an identity provider.

All these example embodiments may be provided in a cloud computing environment which uses an identity management infrastructure, or in a non-cloud computing environment, for example, for financial transactions which need authorization in a non-cloud environment.

A web component testing mechanism 110 is provided for performance testing of a web component 101 using identity information. The web component 101 is tested together with the authorization layer 103 through which a user must access the web component 101.

The web component testing component 110 may include the following components. An identity-dependent branch locating component 120 may be provided for traversing the authorization layer's 103 code and the business logic 102 code to locate code branches where the branching test is dependent on identity information.

A symbolic identity creating component 130 may be provided for creating symbolic identities each identity corresponding to a unique combination of the true/false values for the branching tests located by the identity-dependent branch locating component 120. A symbolic identity is an artificial identity which may have identity claims or attributes with certain values. It is possible that no real user exists with such values and it is possible that some of the combinations of the values are not legal.

A propagating component 140 may be provided for propagating each of the symbolic identities created by the symbolic identity creating component 130 downstream starting from the code section where the identity information is read and propagating through the authorization layer's 103 code and the business logic 102 code of the web component 101.

The propagating component 140 may include a fact collecting component 141 for collecting performance-related facts during the propagation of each symbolic identity through the code. For example, the performance-related facts may be about the degree of loop nesting, database calls, requests made to external web services, file-system operations, etc.

The propagating component 140 may also include an execution forcing component 142 for forcing execution in the direction encoded in the symbolic identity at any branching locations in the code.

The propagating component 140 may also include an identity solution component 143 for obtaining a solution for each of the symbolic identities regarding the propagation. This may calculate the number of performance relevant facts, for example, it may be said that for a certain token there is loop nesting with the depth of 10 and 1 database call.

A comparing component 150 may be provided for comparing the solutions obtained by propagating each of the symbolic identities through the authorization layer's 103 code and the business logic code of the web component 101.

The comparing component 150 may include a cost model component 151 for providing a cost model for each of the collected performance-related facts.

The comparing component 150 may also include a statistical analysis component 152 for determining which aspects of a symbolic identity may affect the performance.

A concrete identity component 160 may be provided for synthesizing concrete identities including the aspects that were found to affect performance. These concrete identities may be used to investigate and test the web component 101 further.

Figure 2:
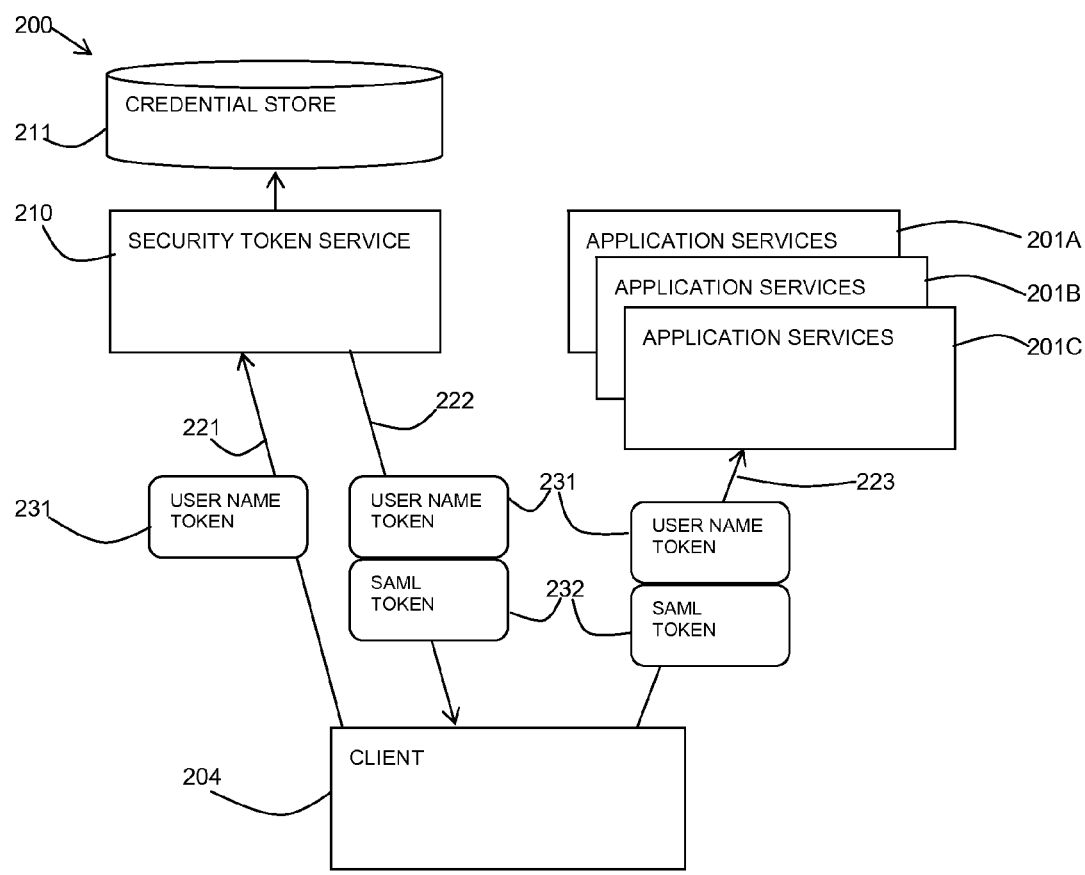
FIG. 2 is a block diagram of an example embodiment of an environment in which the present invention may be implemented.

Referring to FIG. 2, a block diagram shows a first embodiment of an example environment 200 in which the web component testing mechanism may be applied. In this embodiment, WS-Trust communication is used for authorization before a client 204 may access web components in the form of application services 201A, B, C.

An authorization layer may be provided in the form of a security token service 210 having a credential store 211 for users' credential information.

A client 204 may provide 221 a user name token 231 to the security token service 210. The security token service 210 may check the client's user name token 231 and respond 222 with a security token such as a SAML token 232 (Security Assertion Markup Language token).

The client 204 may provide 223 the SAML token 232 and the user name token 231 to any of the application services 201A, B, C in order to provide authorization.

Figure 3:
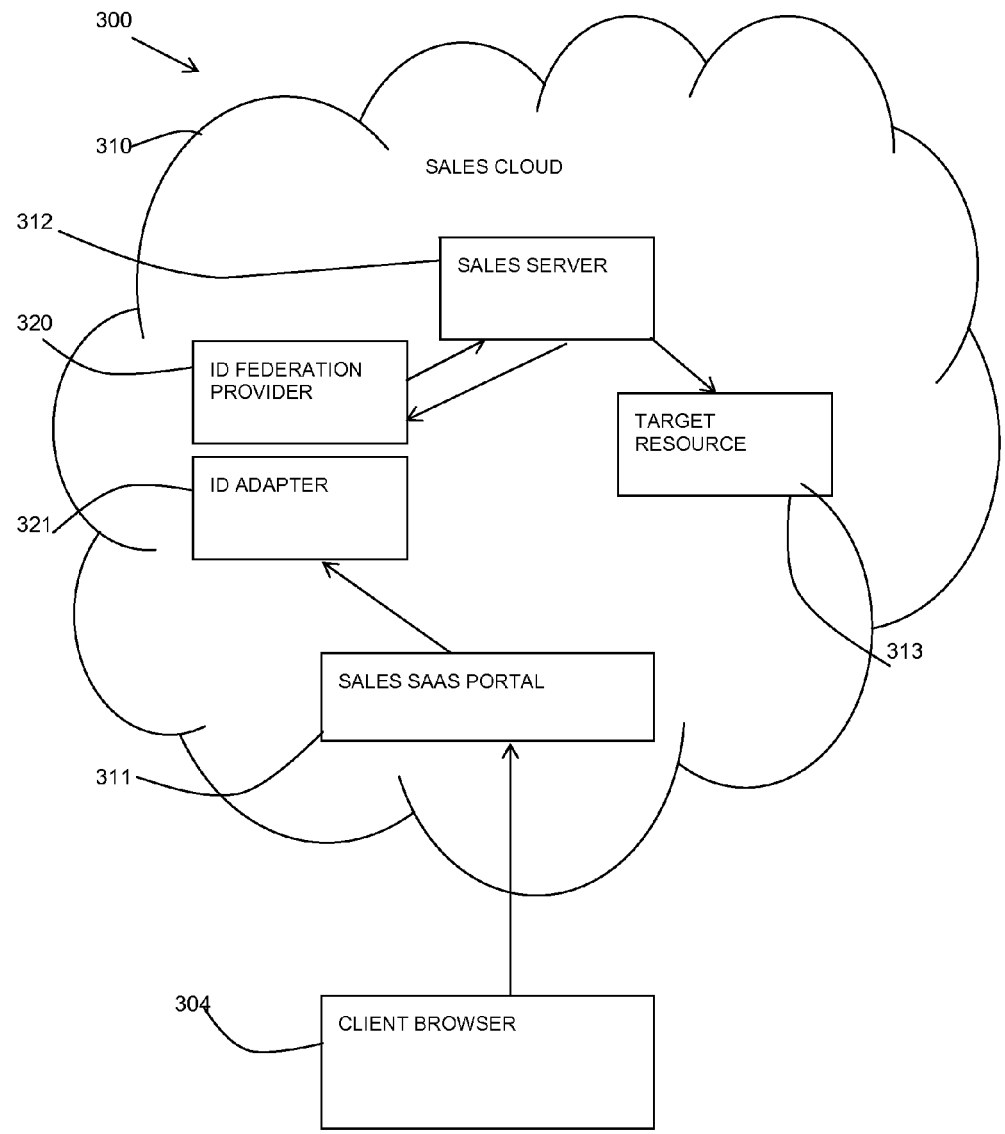
FIG. 3 is a block diagram of a further example embodiment of an environment in which the present invention may be implemented.

Referring to FIG. 3, a block diagram shows a second embodiment of an example environment 300 in which the web component testing mechanism may be applied. In this embodiment, WS-Federation communication is used between a client browser 304 and a sales cloud 310. Authorization of the client browser 304 may be carried out in the cloud 310 by an ID federation provider 320 with an ID adapter 321.

The client browser 304 may access the sales cloud SaaS (software as a service) portal 311 which checks the client browser's 304 authorization via the ID federation provider 320. The ID federation provider 320 may allow the client browser 304 access to the sales server 312 and target resources 313.

Figure 4:
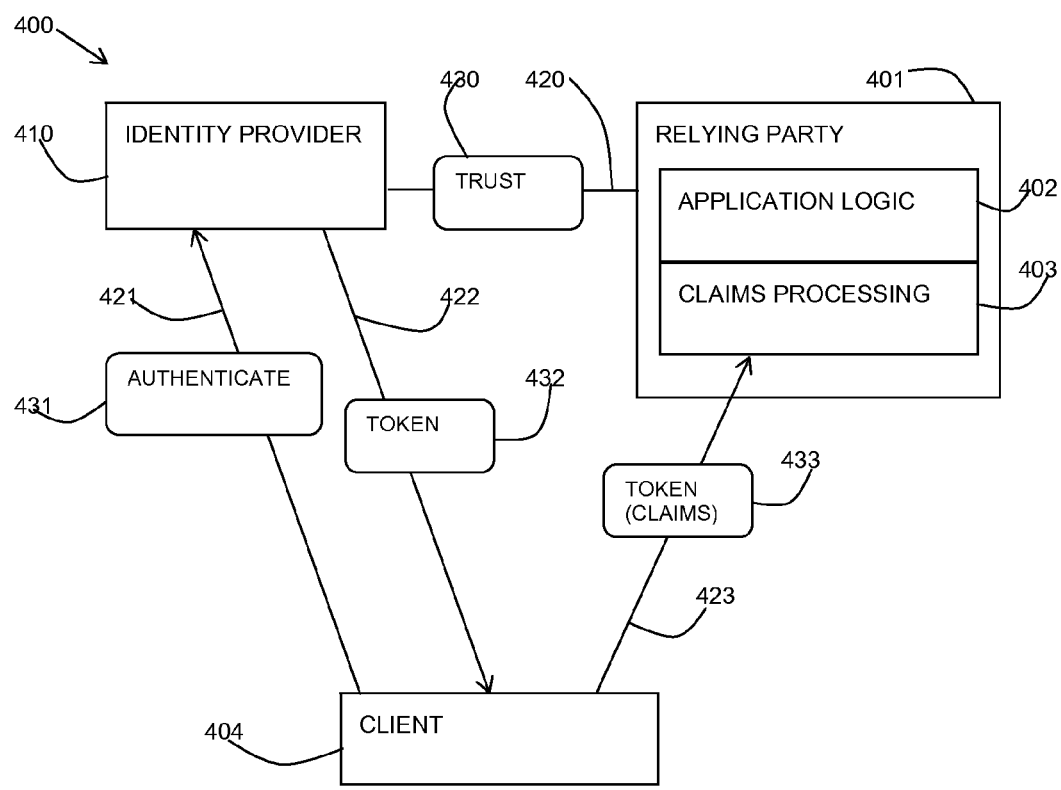
FIG. 4 is a block diagram of a further example embodiment of an environment in which the present invention may be implemented.

Referring to FIG. 4, a block diagram shows a third embodiment of an example environment 400 in which the web component testing mechanism may be applied. In this embodiment, claims-based identity is used between a client 404 and a relying party 401 providing a web component.

In FIG. 4, a trust relationship 430 may exist 420 between an identity provider 410 and the relying party 401 providing the web component. A client 404 may request 421 a claim authentication 431 by the identity provider 410 which may issue 422 a token 432. The client 404 may provide 423 the token 433 of the claim to the relying party 401. Logic at the relying party 401 may include claims processing 403 and application logic 402.

Figure 5:
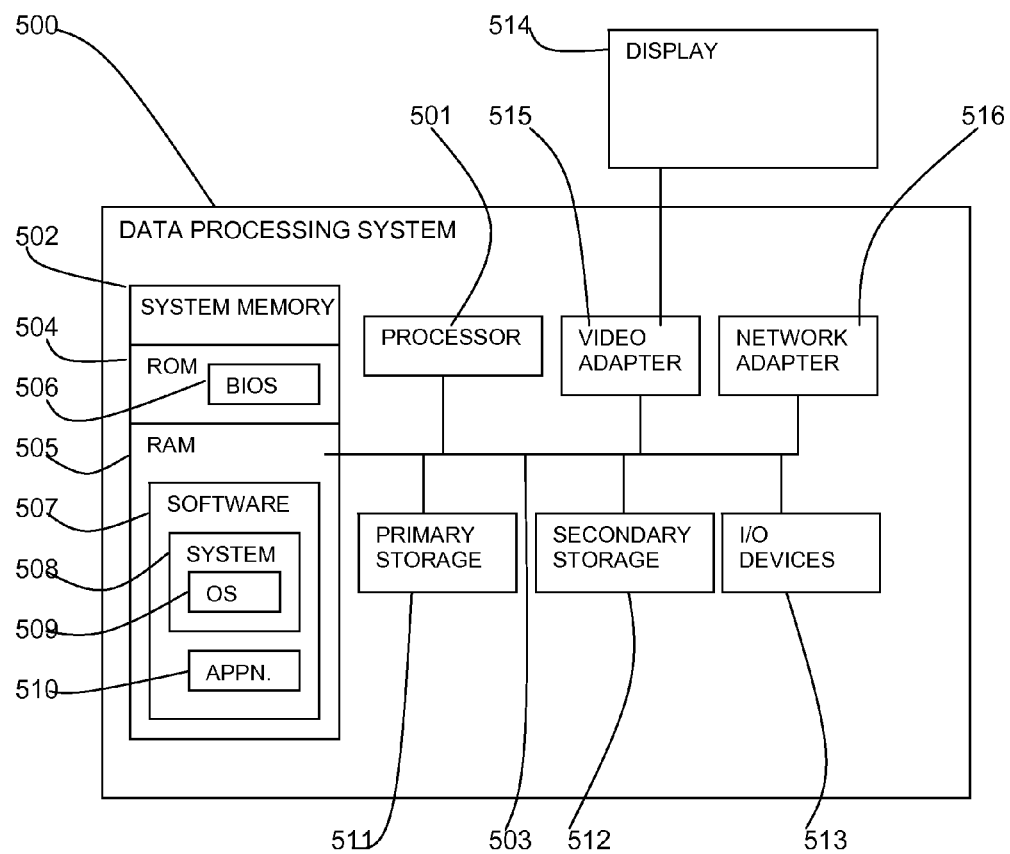
FIG. 5 is a block diagram of an embodiment of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Figure 6:
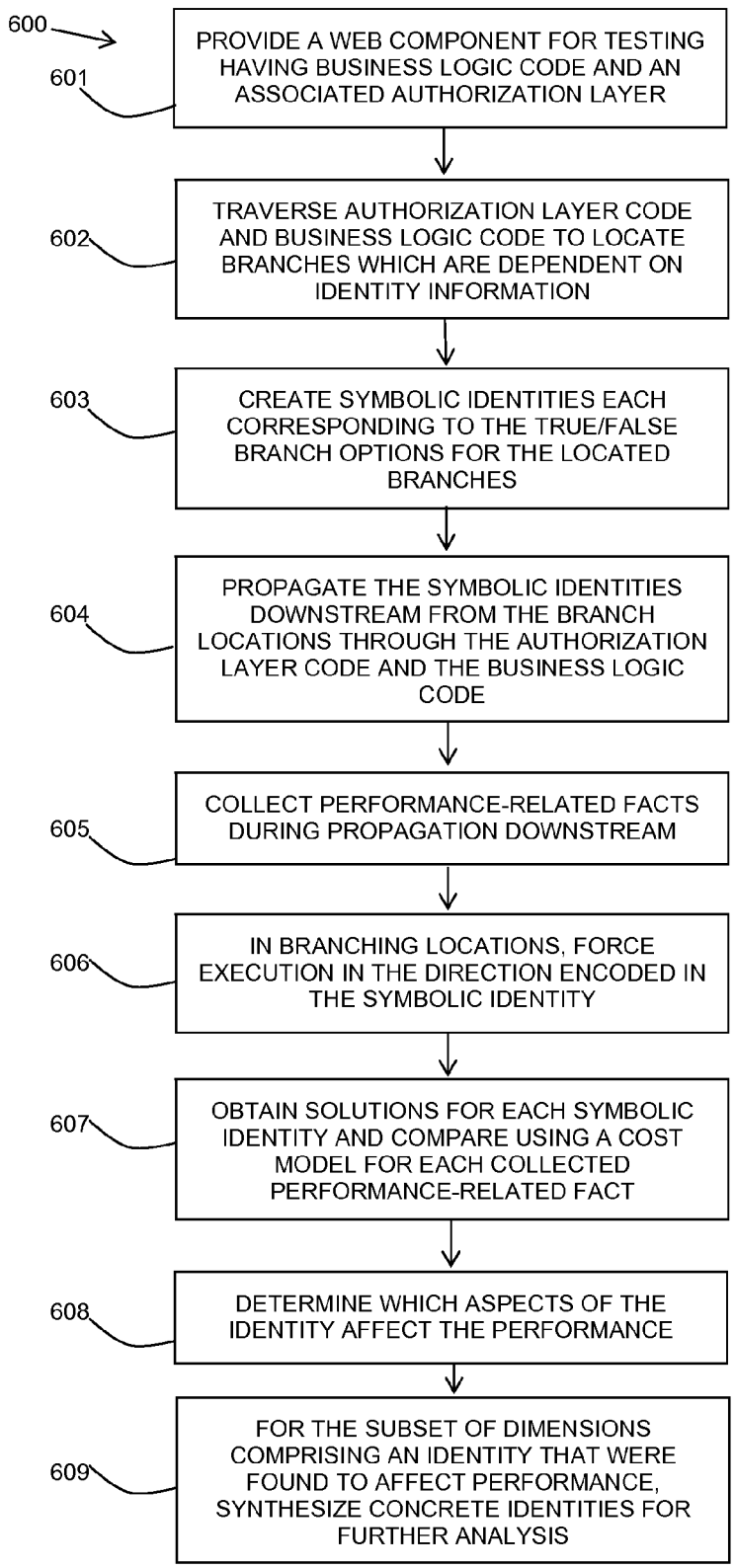
FIG. 6 is a flow diagram of an example embodiment of a method in accordance with the present invention.

Referring to FIG. 6, a flow diagram 600 shows an example embodiment of the described method. The objective of the method is to bind between identities and performance characteristics of the web component.

A web component is provided 601 having business logic code and an associated authorization layer.

The authorization layer's code and the business logic code is traversed 602 to locate code branches where the branching test is dependent on identity information. These branches may be marked by T={t1, . . . tn}.

Symbolic identities may be created 603. Each symbolic identity may correspond to a unique combination of true/false values for the tests at the located branches in T. In this way, artificial identities may be created which have identity claims or attributes with certain values.

If an identity token has 1 claim, then 2n symbolic identities may be created. However, if an identity token has more than one claim, there is a need to multiply on the number of claims. In this case, the code may be analyzed to see which claims are used and how many of them there are. Then, for each claim, those that cause true/false values are taken. When a symbolic identity is built, it may include all the values for all the potential claims.

The symbolic identities may be propagated 604 downstream through the authorization layer's code and the business logic code starting from code statements where identity information is read.

Throughout the downstream propagation, performance-related facts may be collected 605, for example, about the degree of loop nesting, database calls, requests made to external web services, file-system operations, etc.

In branching locations from T, execution is forced 606 in the direction encoded in the symbolic identity.

Solutions for each of the symbolic identities may be obtained 607. Solutions may calculate the number of performance relevant facts (for example, the depth of loop nesting and number of database calls) and the solutions may be compared using a cost model for each of the collected performance facts.

Statistical analysis may be used to determine 608 which aspects of the identity may affect the performance. For example, among 5 possible identity claims, only 2 may make a difference from the performance perspective.

For the subset of dimensions comprising an identity that were found to affect performance, concrete identities may be synthesized 609 for further inspection/testing/etc. by the user. For example, tests may be built for the 2 claims that make a difference from the performance perspective and not for the other 3 claims. The user may be interested, for example, in finding a worst-case execution of the end-to-end system and/or instances of great variance in execution times between different identities, etc.

Although the algorithm is exponential in the number of branches, it should work perfectly well in practice. This is because: (i) typically, the number of identity-related branches is very small (2-3), and (ii) there is a wide range of static-analysis techniques that can be used to share information between different symbolic identities, which allow much less work to be done compared to independent consideration of all the symbolic identities.

Example 1

To make this algorithm more concrete, a real-world example is considered: a web service selling goods. Assume that as a means of payment, the web service receives either a credit card or a proprietary card.

The form of payment may be encoded in the customer token, and may be accessed and processed by the web service's business logic. The token may also contain further information, such as whether the user is a student or a senior, in which case (s)he may be eligible for discounts.

Since the business logic cares both about the form of payment and about the status of the user (student/senior), find two branches should be found in the code: t1 and t2, respectively. This induces four symbolic identities: student/cc, student/pc, senior/cc and senior/pc (where cc and pc are abbreviations of credit card and proprietary card, respectively).

Now assuming that only the means of payment is important from a performance perspective, because in the case of proprietary money, only a simple check of the customer's balance is required, but if a credit card is used, then the credit card web service needs to be contacted to retrieve balance information. This is significantly more expensive (performance-wise) than running a local check.

The static analysis may recover all this information by registering the following performance-wise facts for each symbolic identity:

| Symbolic Identity | Performance Facts |
|---|---|
| Student/cc | Call to external web service (Visa) |
| Student/pc | No facts |
| Senior/cc | Call to external web service (Visa) |
| Senior/pc | No facts |

The table above suggests the following trends based on simple correlation analysis:

The cc/pc property is positively correlated with the call to an external web service.

The student/senior property is not correlated with the performance behaviour of the web service.

Based on these observations, the analysis can synthesize two concrete identities, e.g. for student/cc and student/pc. The user can then exercise the web service with these identities and gain insight into its worst execution time, as well as the difference between the execution times under the two identities.

Example 2

Suppose that the token contains 2 claims: age; and whether the token holder has a driver license or not.

If the code is structured such that regardless of the test whether the relevant individual has a driver's license, most of the ensuing execution path is the same (i.e., both branches merge into the same execution path), then it is possible to use only two different symbolic identities—distinguished by whether the person is above or below 18—instead of the naive approach of testing all four of the possible symbolic identities.

Static analysis is able to reach this observation. For example, top-down data-flow analysis techniques would identify the commonality between the code paths originating in the two branches of the driver's license test.

It should be mentioned here is that many of the components in the cloud are inaccessible without specifying an identity information and so testing them in general is hard as you need to decide which specific identity out of many possible you take for testing the component. For performance testing specifically it is especially important because identities do affect the overall response time and therefore it is important to find the specific properties of the identities that make a significant difference from the response time perspective.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for performance testing of web components using identity information, comprising:
   providing a web component for testing having business logic code and an associated authorization layer code;
   locating, using a processor, branches which are dependent on identity information in the authorization layer code and the business logic code;
   creating, using the processor, symbolic identities with claims or attributes having values corresponding to the branch options of the located branches;
   propagating the symbolic identities downstream from the branch locations through the authorization layer code and the business logic code; and
   analyzing, using the processor, performance of each symbolic identity.

2. The method as claimed in claim 1, wherein creating symbolic identities includes creating a symbolic identity corresponding to a unique combination of the true or false values for the located branches.

3. The method as claimed in claim 1, wherein the identity information includes one or more claims, and creating symbolic identities includes creating symbolic identities for each claim.

4. The method as claimed in claim 1, wherein propagating the symbolic identities downstream includes:
   in branching locations, forcing execution in the direction encoded in the symbolic identity.

5. The method as claimed in claim 1, wherein analyzing performance of each symbolic identity includes:
   collecting performance-related facts during propagation; and
   providing cost models for each performance-related fact.

6. The method as claimed in claim 5, wherein analyzing performance of each symbolic identity includes:
   obtaining solutions including the number of performance-related facts for each symbolic identity; and
   comparing the solutions using the cost models for the performance-related facts.

7. The method as claimed in claim 1, including:
   determining which aspects of the symbolic identities affect the performance.

8. The method as claimed in claim 1, including:
   determining a subset of dimensions of a symbolic identity found to affect performance; and
   synthesizing a concrete identity for further analysis.

9. The method as claimed in claim 8, wherein determining a subset of dimensions of a symbolic identity found to affect performance includes determining identity claims which affect performance.

10. The method as claimed in claim 1, wherein the web component is provided via a network and the authorization layer code is provided by an identity provider.

11. The method as claimed in claim 1, wherein the web component is provided in a cloud computing environment and the authorization layer code is provided by the cloud computing environment.

12. A system for performance testing of web components using identity information, the system comprising:

a processor programmed to initiate executable operations comprising:
  providing a web component for testing having business logic code and an associated authorization layer code;
  locating branches which are dependent on identity information in the authorization layer code and the business logic code;
  creating symbolic identities with claims or attributes having values corresponding to the branch options of the located branches;
  propagating the symbolic identities downstream from the branch locations through the authorization layer code and the business logic code; and
  analyzing, using the processor, performance of each symbolic identity.

13. The system as claimed in claim 12, wherein propagating the symbolic identities downstream includes:
  in branching locations, forcing execution in the direction encoded in the symbolic identity.

14. The system as claimed in claim 12, wherein analyzing performance of each symbolic identity includes:
  collecting performance-related facts during propagation; and
  providing cost models for each performance-related fact.

15. The system as claimed in claim 14, wherein analyzing performance of each symbolic identity includes:
  obtaining solutions including the number of performance-related facts for each symbolic identity; and
  comparing the solutions using the cost models for the performance-related facts.

16. The system as claimed in claim 12, wherein the processor is programmed to initiate a further executable operation comprising:
  determining which aspects of the symbolic identities affect the performance.

17. The system as claimed in claim 12, wherein the processor is programmed to initiate further executable operations comprising:
  determining a subset of dimensions of a symbolic identity found to affect performance; and
  synthesizing a concrete identity for further analysis.

18. The system as claimed in claim 12, wherein the web component is provided via a network and the authorization layer code is provided by an identity provider.

19. The system as claimed in claim 12, wherein the web component is provided in a cloud computing environment and the authorization layer code is provided by the cloud computing environment.

20. A computer program product for performance testing of web components using identity information, the computer program product comprising:
  a computer readable storage device having program code stored thereon,
  the program code executable by a processor to perform:
    providing, using the processor, a web component for testing having business logic code and an associated authorization layer code;
    locating, using a processor, branches which are dependent on identity information in the authorization layer code and the business logic code;
    creating, using the processor, symbolic identities with claims or attributes having values corresponding to the branch options of the located branches;
    propagating, using the processor, the symbolic identities downstream from the branch locations through the authorization layer code and the business logic code; and
    analyzing, using the processor, performance of each symbolic identity, wherein the computer usable storage device does not consist of a transitory, propagating signal.

* * * * *